United States Patent [19]

Berke et al.

[11] 4,414,567
[45] Nov. 8, 1983

[54] PATTERN GENERATING CIRCUIT

[75] Inventors: Herbert Berke, Phoenix, Ariz.; Joseph Portoghese, Altamonte Springs, Fla.

[73] Assignee: The United States of America as represented by the Secretary of the Navy, Washington, D.C.

[21] Appl. No.: 305,075

[22] Filed: Sep. 24, 1981

[51] Int. Cl.³ .............................................. H04N 7/02
[52] U.S. Cl. ................... 358/139; 315/365; 328/188; 340/734; 358/10; 358/183
[58] Field of Search ......................... 340/734; 315/365; 328/187, 188; 358/10, 139, 181, 183, 173; 307/546, 563

[56] References Cited

U.S. PATENT DOCUMENTS

| | | | |
|---|---|---|---|
| 2,978,540 | 4/1961 | Coate et al. | 328/188 |
| 3,559,092 | 1/1971 | Roth | 358/10 |
| 3,578,906 | 5/1971 | Holmstrom et al. | 358/183 |
| 3,750,038 | 7/1973 | Meise et al. | 358/173 |

OTHER PUBLICATIONS

DeJong-Crystal Controlled TV Pattern Generator-Electronics, Australia, Jun. 1980-vol. 40, #3-pp. 42-50, 53.
TV Test Pattern Generator-Elektor-vol. 1, #7, pp. 1149-1152-Nov. 1975.
Pores-Video Switching for TV Broadcast Centers-Electronics, Dec. 1956-pp. 146-149.
Birch-Cross Hatch Generator-Practical Electronics-vol. 12, #9, pp. 708-715, Sep. 1976.

*Primary Examiner*—Joseph A. Orsino, Jr.
*Attorney, Agent, or Firm*—Robert F. Beers; Robert W. Adams; Robert J. Veal

[57] ABSTRACT

A pattern generating circuit is disclosed for providing a fixed test pattern to be broadcast on a video display system such that an individual may test or repair the aforementioned video display system. The pattern generating circuit provides a horizontal sync signal, a vertical sync signal, and first and second video component signals which are then summed by a summing amplifier to form a video signal. The horizontal and vertical sync signals are then supplied to the video display system so as to activate the same. This, in turn, allows the video display system, upon receiving the video signal, to broadcast on its display screen the fixed test pattern.

9 Claims, 4 Drawing Figures

PATTERN GENERATING CIRCUIT

BACKGROUND OF THE INVENTION

1. Field of the Invention

This invention relates generally to a video display system pattern generating circuit. More particularly, this invention relates to an electronics circuit for generating a fixed test pattern on a cathode ray tube or the like which can be utilized for the testing or repairing of the aforementioned cathode ray tube or the like.

2. Description of the Prior Art

Heretofore, numerous electronic circuits have been employed to produce on a video display system a fixed pattern such that a person may test or repair the video display system. Such circuits are too numerous to discuss herewith. Besides, most thereof constitute prior art devices which are well known to the artisan, thereby obviating the need for further discussion thereof.

Of course, there are several prior art devices which are of some significance, inasmuch as they at least remotely or indirectly concern subject matter that is pertinent to the instant pattern generating circuit.

For example, U.S. Pat. No. 2,741,722 to J. P. Shields discloses a television pattern generator comprising a carrier wave oscillator, means for coupling the oscillator to the antenna input of a television receiver, a high frequency oscillator adapted to operate at multiples of the frequency of the horizontal sweep oscillator in the receiver, and a source of operating voltage. In addition, the aforesaid television pattern generator includes a resistance in series with the voltage source, with the carrier wave oscillator, and the high frequency oscillator, the two oscillators being in parallel with each other, and a gas tube oscillator adapted to be tuned to a frequency which is an even multiple of the vertical sweep oscillator of the receiver and connected to the carrier wave oscillator.

U.S. Pat. No. 2,855,515 to F. R. C. Bernard discloses a television test apparatus comprising a first multivibrator, means to apply a television blanking signal to the first multivibrator to block the same for the duration of the blanking signal and to render the same oscillating between blanking pulse signals, a second multivibrator, and a blanking signal separator coupled between the second multivibrator and the blanking signal applying means to separate the horizontal blanking signal from the vertical blanking signal and render the second multivibrator oscillating between the separated blanking signal pulses. In addition, the television test apparatus includes a combining circuit coupled to both of the aforesaid multivibrators to produce a square wave signal of recurrence rate of one of the multivibrators with phase inversion at twice the recurrence rate of the other multivibrator, and a mixing circuit coupled to the combining circuit and to the blanking signal applying means to interpose blanking signal in the output signal from the combining circuit.

Unfortunately, the aforementioned devices of the prior art ordinarily leave something to be desired, especially from the standpoints of accuracy, efficiency, and complexity in design. In addition, the aforementioned devices of the prior art do not operate in exactly the same manner as the subject invention, and contain a combination of elements that is somewhat different from that of the present invention.

SUMMARY OF THE INVENTION

The subject invention overcomes some of the disadvantages of the prior art, including those mentioned above, in that it comprises a relatively simple pattern generating circuit which will produce on the display screen of a video display system a predetermined pattern.

Included in the subject invention are a master clock for generating a horizontal sync signal, a phase lock loop circuit for producing, in response to the horizontal sync signal, a first video component signal, and a one-shot multivibrator for expanding the pulse width of each pulse of the first video component signal. In addition, the subject invention includes means for producing, in response to the horizontal sync signal, a second video component signal, a summing amplifier for combining the aforesaid first and second video component signals so as to form a video signal, and a counter for producing, response to the horizontal sync signal, a vertical sync signal.

The horizontal and vertical sync signals are then supplied to a video display system so as to activate the video display system such that when the video display system receives the video signal, the video display system will broadcast on the screen thereof a test pattern.

DESCRIPTION OF THE PREFERRED EMBODIMENT

Figure 1:
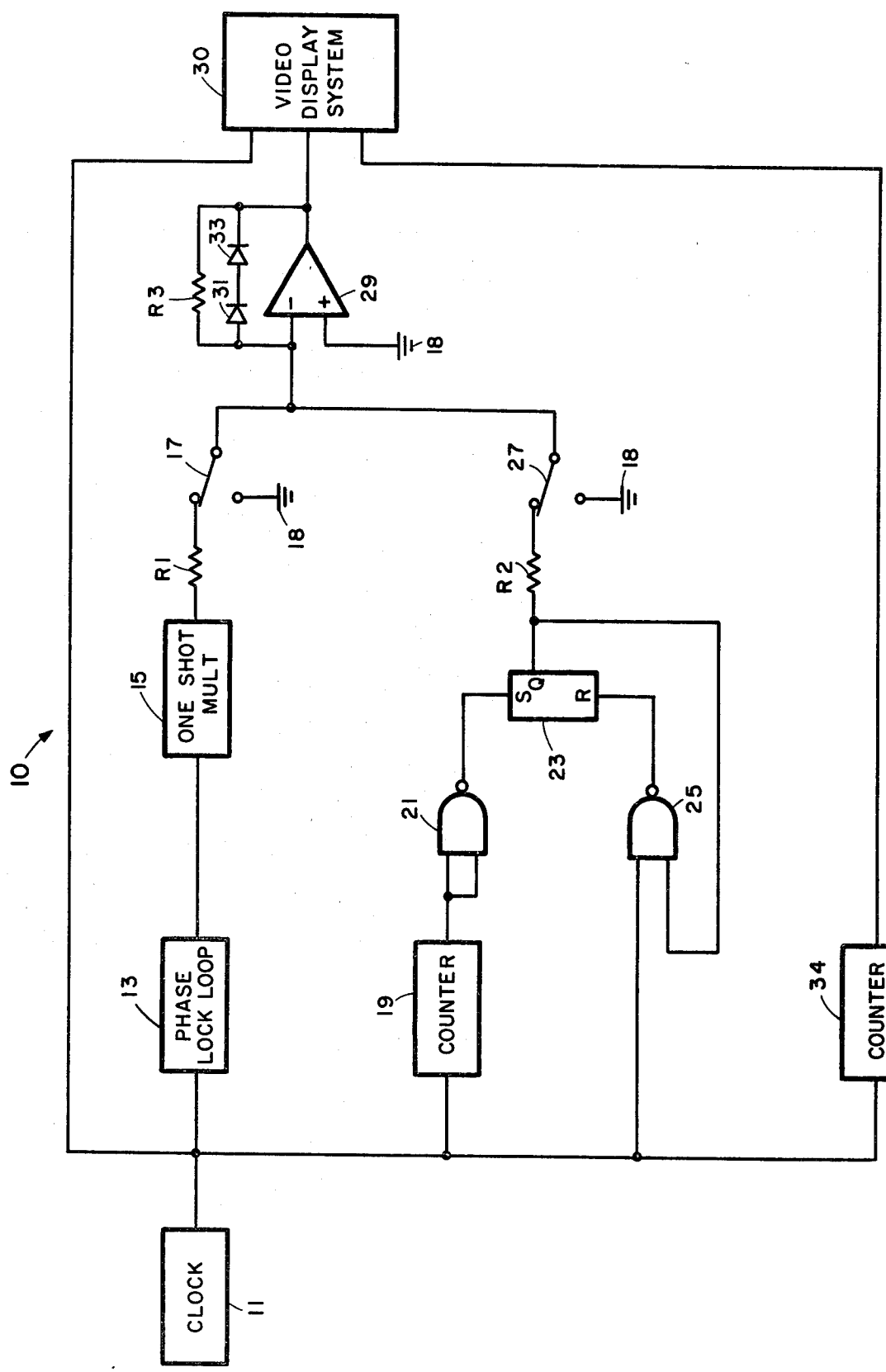
FIG. 1 is an electrical schematic diagram of the pattern generating circuit constituting the subject invention.

The preferred embodiment of the subject invention will now be discussed in conjunction with all of the figures of the drawing, wherein like parts are depicted by like reference numerals insofar as it is possible and practical to do so.

Referring now to FIG. 1, there is shown a pattern generating circuit 10 which includes a master clock signal generator 11 which produces a series of fundamental pulses at the output thereof, the frequency of which has been preset therein in accordance with the requirement of the given operational circumstances.

The output of clock 11 is connected to the input of a phase lock loop circuit 13, the output of which is connected to the input of a one-shot multivibrator 15, with the output thereof connected through a resistor R1 to the first terminal of a switch 17. The second terminal of switch 17 is, in turn, connected to a ground 18.

In addition, the output of clock 11 is connected to the input of a counter 19, the output of which is connected to the first and second inputs of a NAND gate 21, with the output thereof connected to the set input of a JK flip-flop 23. The output of clock 11 is also connected to the first input of a NAND gate 25, the output of which is connected to the reset input of JK flip-flop 23, with the output thereof connected to the second input of NAND gate 25. The Q output of JK flip-flop 23 is, in addition, connected through a resistor R2 to the first terminal of a switch 27. The second terminal of switch 27 is connected to ground 18.

The third terminal of switch 17 and the third terminal of switch 27 are connected to the negative input of a summing amplifier 29, while the positive input of summing amplifier 29 is connected to ground 18.

Connected between the negative input and the output of summing amplifier 29 is a resistor R3. A diode 31 has the anode thereof connected to the negative input of summing amplifier 29, while the cathode of diode 31 is connected to the anode of a diode 33. The cathode of diode 33 is, in turn, connected to the output of summing amplifier 29.

The output of summing amplifier 29 is connected to the video input of a video display system 30, which may be, for example, a cathode ray tube or the like. The output of master clock signal generator 11 is connected to the horizontal sync input of video display system 30. In addition, the output of clock 11 is connected to the input of a counter 34, the output of which is connected to the vertical sync input of video display system 30.

In the exemplary circuit of FIG. 1, according to the subject invention, components successfully utilized are as follows:

| Component | Component Name | Model No. | Manufacturer |
| --- | --- | --- | --- |
| 13 | Phase Lock Loop | NE/SE 565 | Signetics |
| 15 | One-Shot Multivibrator | 9602 | Fairchild |
| 19,34 | Counter | 9305 | Fairchild |
| 21,25 | NAND Gate | 7400 | Fairchild |
| 23 | JK Flip-Flop | 74109 | Fairchild |
| 29 | Operational Amplifier | 3507 | Burr Brown |
| 31,33 | Diode | 1N914 | Texas Instruments |

In addition, it should be noted at this time that the values of resistors R1, R2, and R3 are respectively 5000 ohms, 5000 ohms, and 1000 ohms.

The operation of the subject invention will now be discussed in conjunction with all of the figures of the drawing.

Figure 2:
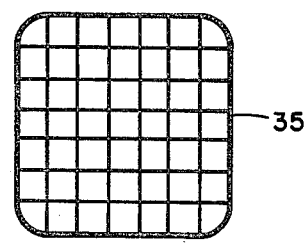
FIG. 2 illustrates the display screen of a video display system having the test pattern generated by the circuit of FIG. 1 broadcast thereon.

Referring now to FIGS. 1 and 2, there is shown test pattern generator 10 which produces the test pattern of FIG. 2 on a video display screen 35 of video display system 30. The pattern of FIG. 2 is characterized by a plurality of horizontal lines with spacing between adjacent horizontal lines being one inch, and a plurality of vertical lines with spacing between adjacent vertical lines being one inch. Display screen 35, in the preferred embodiment of the subject invention, is a twenty-one inch diagonal screen having fifteen inch sides, and is adapted for use with a 1000 line video display system.

Clock 11 provides at the output thereof a signal similar to that depicted in FIG. 3A. The signal of FIG. 3A has a series of uniformly spaced pulses, the frequency of which is approximately thirty-three kilohertz. This frequency of thirty-three kilohertz is, in turn, the frequency of a horizontal sync signal for a one thousand line television system.

Figure 3:
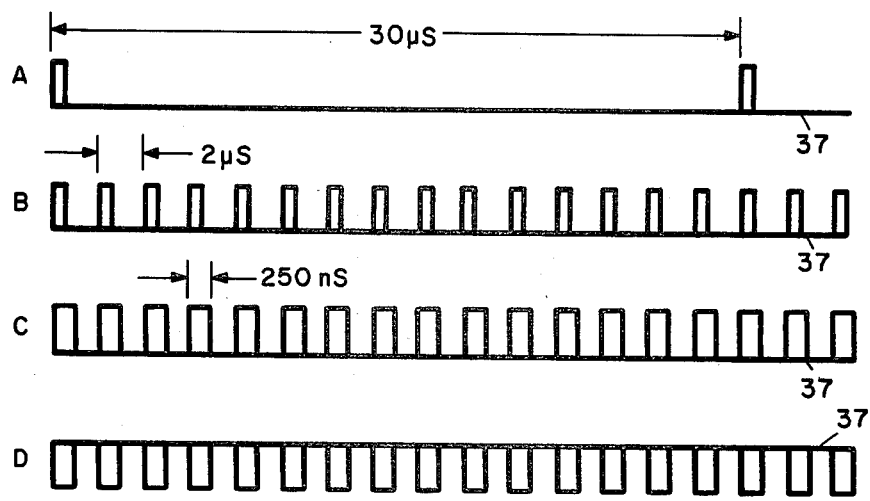
FIG. 3 is a graphical representation of various signals which occur at the outputs of some of the elements of FIG. 1.
Figure 4:
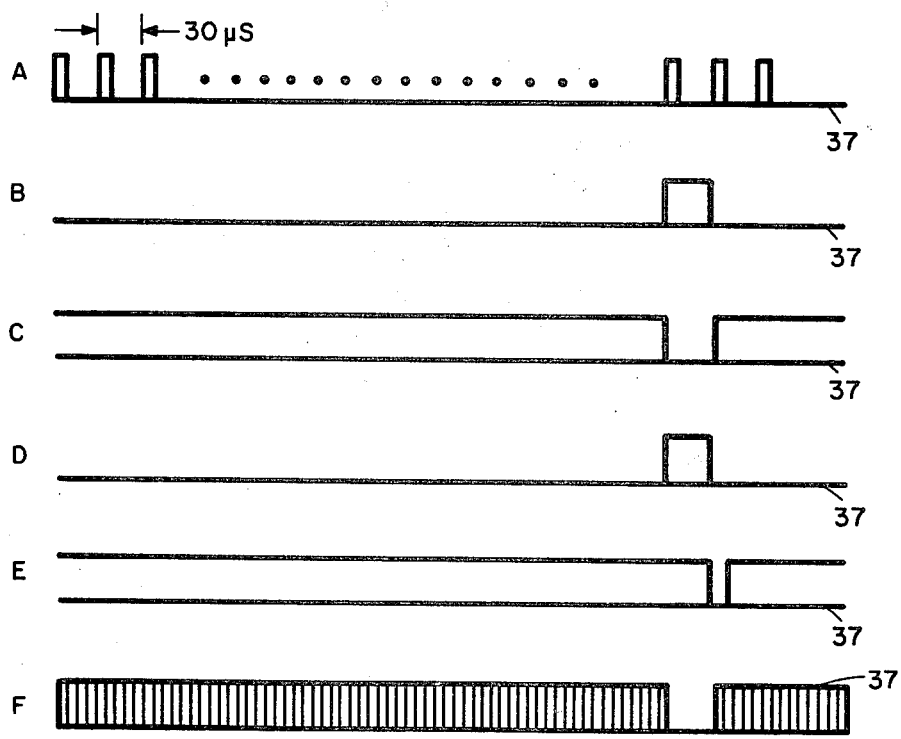
FIG. 4 is an expanded graphical representation of one of the signals of FIG. 3 and other internal output signals of the system of FIG. 1 coordinated therewith.

At this time it should be noted that solid line 37 represents the line of zero voltage in the signal waveforms of FIGS. 3 and 4. As mentioned above, the spacing between adjacent vertical lines of the test pattern appearing on screen 35 is one inch. This, in turn, requires that phase lock loop circuit 13 be preset to provide at the output thereof a signal having a frequency of 500 kilohertz upon receiving at the input thereof a signal having a frequency of thirty-three kilohertz. Thus, when the signal of FIG. 3A is supplied to the input of phase lock loop circuit 13, a signal similar to that depicted in FIG. 3B is provided at the output thereof. The signal of FIG. 3B is then supplied to the input of one-shot multivibrator 15 which expands the pulse width of each pulse of the signal of FIG. 3B to a pulse width of approximately two hundred fifty nanoseconds, as shown in the signal waveform of FIG. 3C. The expansion of each pulse of the signal of FIG. 3C results in each vertical line which appears on screen 35 having a width of one-eighth of an inch.

The signal of FIG. 3C is, in turn, supplied through switch 17 to summing amplifier 29 which inverts the aforementioned signal, as shown in the signal waveform of FIG. 3D.

It should be noted at this time that the signal waveform of FIG. 3D is a component of the signal waveform of FIG. 4F. The formation of the signal waveform of FIG. 4F by summing amplifier 29 will be discussed more fully below. In addition, it should be noted that diodes 31 and 33 function as clamping diodes so as to limit the voltage swing of each pulse of the signal of FIG. 3D to one volt, zero to peak.

The signal of FIG. 3D is then supplied to the video input of the aforesaid video display system 30 so as to cause video display system 30 to broadcast upon screen 35 thereof the vertical lines of the test pattern of FIG. 2.

To facilitate the better understanding of that portion of the mode of operation of the invention to be discussed now, it should be noted at this time that the signal waveform of FIG. 4A is, in fact, identical to that of FIG. 3A; however, in the portrayal thereof in FIG. 4A, the time frame has been greatly reduced so as to provide a frame that will permit the disclosure of the signals shown in FIGS. 4B through 4F.

As discussed previously, the spacing between adjacent horizontal lines of the test pattern appearing on screen 35 is one inch. This, in turn, requires that counter 19 be preset to count to thirty-five and then provide at the output thereof a logic "1" pulse. Thus, when the signal of FIG. 4A is supplied to the input of counter 19, counter 19 provides at the output thereof a pulse signal similar to that depicted in FIG. 4B. The pulse signal of FIG. 4B is then supplied to NAND gate 21, which inverts the signal so as to provide at the output thereof a signal similar to that depicted in FIG. 4C.

When the signal of FIG. 4C changes from a logic "1" state to a logic "0" state, the Q output of flip-flop 23 will change from a logic "0" state to a logic "1" state as shown in the signal waveform of FIG. 4D. This, in turn, opens NAND gate 25 so as to allow the thirty-sixth clock pulse of the signal of FIG. 4A to pass therethrough and be inverted thereby, as shown in the signal waveform of FIG. 4E.

When the signal of FIG. 4E changes from a logic "1" state to a logic "0" state, the Q output of flip-flop 23 will change from a logic "1" state to a logic "0" state as shown in the signal waveform of FIG. 4D.

The signal of FIG. 4D is, in turn, supplied through switch 27 to summing amplifier 29, which inverts the signal of FIG. 4D and combines the aforementioned signal of FIG. 4D with the signal of FIG. 3D so as to provide at the output thereof the video signal of FIG. 4F.

As discussed previously, the signal component of FIG. 3D of the signal of FIG. 4F, when applied to the video input of video display system 30, will cause the aforementioned video display system 30 to broadcast upon screen 35 thereof the vertical lines of the test pattern of FIG. 2.

In a like manner, the signal component of FIG. 4D of the signal of FIG. 4F, when applied to the video input of video display system 30, will cause the aforementioned video display system 30 to broadcast upon screen 35 thereof the horizontal lines of the test pattern of Fig. 2. Thus, the signal of FIG. 4F, when applied to the video input of video display system 30, will cause the aforementioned video display system 30 to broadcast upon screen 35 the test pattern of FIG. 2.

The signal of FIG. 3A is also supplied to the horizontal sync input of video display system 30 so as to provide video display system 30 with a horizontal sync signal. In addition, the signal of FIG. 3A is supplied to the input of counter 34, which divides the aforesaid clock signal of FIG. 3A by 525, such that counter 34 will provide at the output thereof a sixty hertz signal. The aforementioned sixty hertz signal is then supplied to the veritcal sync input of video display system 30 so as to provide video display system 30 with a vertical sync signal. The aforesaid horizontal and vertical sync signals, in turn, activate video display system 30 such that video display system 30, upon receiving at the video input thereof the signal of FIG. 4F, will broadcast upon the display screen 35 thereof the test pattern of FIG. 2.

From the foregoing, it may readily be seen that the subject invention comprises a new, unique, and exceedingly useful test pattern generating circuit which constitutes a considerable improvement over the known prior art. Obviously, many modifications and variations of the present invention are possible in light of the above teachings. It is, therefore, to be understood that within the scope of the appended claims, the invention may be practiced otherwise than as specifically described.

What is claimed is:

1. A pattern generating circuit for a one thousand line display comprising, in combination:

means having an output, for generating a horizontal sync signal, said horizontal sync signal having a series of uniformly spaced pulses of a first predetermined frequency of 33 kilohertz;

means having an input connected to the output of said horizontal sync signal generating means, and an output, for producing, in response to said horizontal sync signal, a first video component signal having a series of uniformly spaced pulses of a second predetermined frequency, said second frequency selected to provide a particular horizontal spacing in said pattern;

a one-shot multivibrator having an input connected to the output of said first video component signal producing means and an output, for deriving a pulse suitable for generating narrow vertical lines from each pulse of said first video component signal;

means having an input connected to the output of said horizontal sync signal generating means and an output, for producing, in response to said horizontal sync signal, a second video component signal having a series of uniformly spaced pulses of a third predetermined frequency, said third frequency selected to provide vertical spacing equivalent to said horizontal spacing; said second video component signal producing means comprising:

a counter having an input connected to the output of said horizontal sync signal genrating means, and an output;

a first NAND gate having first and second inputs connected to the output of said counter, and an output;

a second NAND gate having first and second inouts and an output, with the first input thereof connected to the output of said horizontal sync signal generating means;

a flip-flop having a set input connected to the output of said first NAND gate, a reset input connected to the output of said second NAND GATE, and a Q output connected to the second input of said second NAND gate;

means having an input and an output, with the input thereof connected to the output of said multivibrator and the output of said second video component signal producing means, for summing said first and second video component signals so as to provide at the output thereof a video signal; and means having an input connected to the output of said horizontal sync signal generating means and an output, for producing, in response to said horizontal sync signal, a vertical sync signal.

2. The circuit of claim 1, wherein said summing means comprises:

a ground;

a first switch having first, second, and third terminals, the first terminal of which is connected to the output of said pulse width expanding means, and the second terminal of which is connected to said ground;

a second switch having first, second, and third terminals, the first terminal of which is connected to the output of said second video component signal producing means, and the second terminal of which is connected to said ground;

an operational amplifier having a negative input connected to the third terminal of said first switch and the third terminal of said second switch, a positive input connected to said ground, and an output;

a first diode having an anode connected to the negative input of said operational amplifier, and a cathode; and a second diode having an anode connected to the cathode of said first diode, and a cathode connected to the output of said operational amplifier.

3. The circuit of claim 1, wherein said vertical sync signal producing means comprises a counter.

4. The circuit of claim 1, further characterized by a video display having a display screen, a first input connected to the output of said horizontal sync signal generating means, a second input connected to the outut of said summing means, and a third input connected to the output of said vertical sync signal producing means, said video display system being adapted for broadcasting on the screen thereof a test pattern, in response to said horizontal sync, vertical sync, and video signals.

5. A circuit for generating a test pattern for a one thousand line display comprising, in combination:

a master clock signal generator having an output of 33 kHz;

a phase lock loop circuit having an input connected to the output of said master clock signal generator, and an output;

a one-shot multivibrator having an input connected to the output of said phase lock loop circuit, and an output;
a ground;
a first switch having first, second, and third terminals, the first terminal of which is connected to the output of said one-shot multivibrator, and the second terminal of which is connected to said ground;
a first counter having an input connected to the output of said master clock signal generator, and an output;
a second counter having an input connected to the output of said master clock signal generator, and an output;
a first NAND gate having first and second inputs connected to the output of said first counter, and an output;
a second NAND gate having first and second inputs and an output, with the first input thereof connected to the output of said master clock signal generator;
a flip-flop havng a set input, a reset input, and a Q output, with the set input thereof connected to the output of said first NAND gate, with the reset input thereof connected to the output of said second NAND gate, and with the Q output thereof connected to the second input of said second NAND gate;

a second switch having first, second, and third terminals, with the first terminal thereof connected to said ground; and
a summing amplifier having a negative input connected to the outputs of said first and second switches, a positive input connected to said ground, and an output.

6. The circuit of claim 5, wherein said flip-flop comprises a JK flip-flop.

7. The circuit of claim 5, wherein said summing amplifier comprises an operational amplifier.

8. The circuit of claim 5, further characterized by
a first diode having a cathode and an anode, with the anode thereof connected to the negative input of said summing amplifier; and
a second diode having a cathode and an anode, with the anode thereof connected to the cathode of said first diode, and the cathode thereof connected to the output of said summing amplifier.

9. The circuit of claim 5, further characterized by a video display system having a horizontal sync input, a vertical sync input, and a video input, with the horizontal sync input thereof connected to the output of said master clock signal generator, with the vertical sync input thereof connected to the output of said second counter, and with the video input thereof connected to the output of said operational amplifier.

* * * * *